United States Patent
Osterried et al.

(10) Patent No.: US 6,446,538 B2
(45) Date of Patent: Sep. 10, 2002

(54) ARRANGEMENT FOR HYDRAULIC ACTUATION OF A MOVABLE COMPONENT ON VEHICLES

(75) Inventors: Jürgen Osterried, Pfronten (DE); Peter Schmied, Schongau (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/785,566

(22) Filed: Feb. 20, 2001

(30) Foreign Application Priority Data

Feb. 22, 2000 (AT) .............................................. 277/00

(51) Int. Cl.$^7$ ............................................. F15B 11/08
(52) U.S. Cl. .............................. 91/438; 91/446; 91/468
(58) Field of Search .......................... 91/438, 439, 442, 91/468, 268, 446, 437

(56) References Cited

U.S. PATENT DOCUMENTS

| | | | |
|---|---|---|---|
| 3,370,512 A | * 2/1968 | McRae | 91/446 X |
| 3,403,601 A | * 10/1968 | Eddy | 91/438 |
| 3,437,012 A | * 4/1969 | Bjorklund | 91/446 X |
| 4,211,254 A | * 7/1980 | Dyal | 91/446 X |
| 4,383,476 A | * 5/1983 | Ewald | 91/442 |
| 4,711,155 A | * 12/1987 | Brunner | 91/446 |
| 5,209,153 A | * 5/1993 | Araki et al. | 91/446 X |
| 5,355,773 A | * 10/1994 | Winkels | 91/468 X |
| 5,529,132 A | * 6/1996 | Evarts | 91/268 X |

FOREIGN PATENT DOCUMENTS

GB  1513171  * 6/1978  .................. 91/438

* cited by examiner

Primary Examiner—John E. Ryznic
(74) Attorney, Agent, or Firm—Dykema Gossett PLLC

(57) ABSTRACT

An arrangement for hydraulic actuation of a movable component on vehicles, particularly a vehicle top, trunk lid, a cover or the like, includes at least one double-action working cylinder (1) whose working chambers are connected to a pressure source (5) via a pressure line (4) or whose working chambers are at least temporarily connectable thereto through a switching valve (11). To make possible an automatic emergency operation of the normally hydraulic operated vehicle component in a simple and secure manner during failure of the pressure source, and in spite of the small available space and the mounting site with its difficult accessibility, a check valve (16) is inserted into the pressure line (4) blocking in the direction of the pressure source (5) and a pressure relief line (17) originates at a location between the check valve (16) and the switching valve arrangement for the working cylinder (1, 11) whereby a shut-off element (19) is inserted in the pressure relief line that opens when the pressure of the pressure source drops.

6 Claims, 1 Drawing Sheet

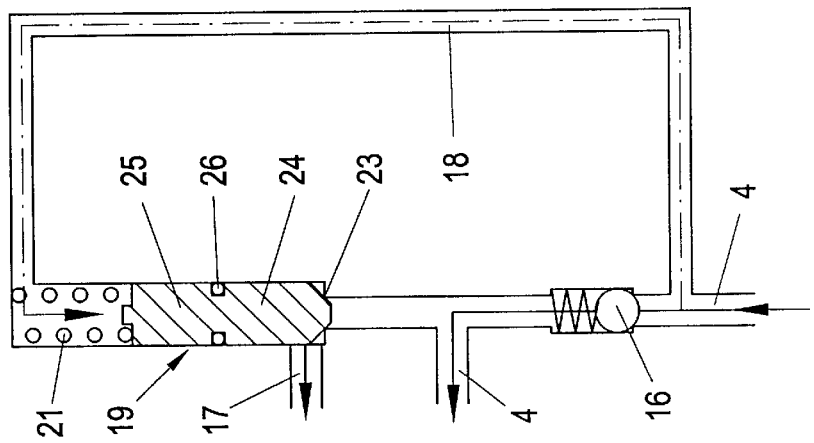
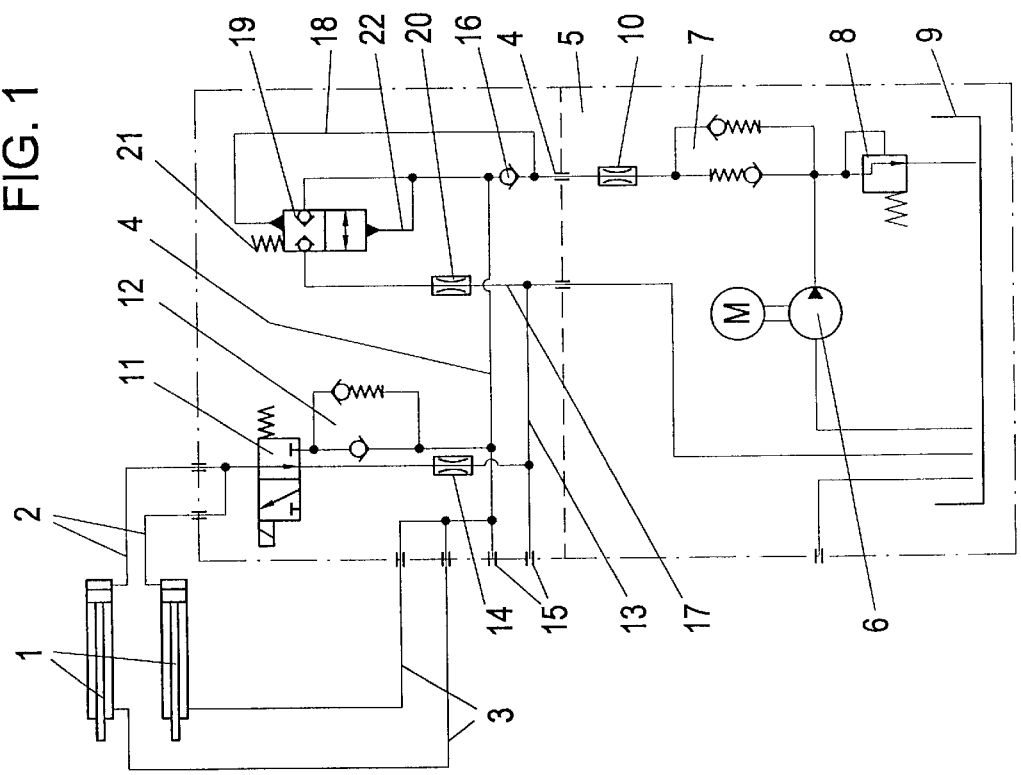

ARRANGEMENT FOR HYDRAULIC ACTUATION OF A MOVABLE COMPONENT ON VEHICLES

BACKGROUND OF THE INVENTION

1. Field of the Invention

The invention relates to an arrangement for hydraulic actuation of a movable component on vehicles, particularly a vehicle top, trunk lid, a cover or the like, having at least one double-action working cylinder whose working chambers are connected to a pressure source via a pressure line of whose working chambers are at least temporarily connectable thereto through a switching valve.

2. The Prior Art

Arrangements of this type are well known and make possible, for example, automatic actuation of vehicle doors, hoods, service access covers, covers for the trunk, the space for a convertible top or the convertible top itself. In case of shut-off or failure of the operating pressure (which means shut-off or failure of a (hydraulic) unit during automatic operation), the cover, the vehicle top or the like should remain hydraulically locked in a particular position to prevent uncontrolled retraction and dangers of injury related thereto.

This is achieved in most systems through a so-called emergency hand-operated bolt, which blocks the connecting bore between the two working chambers of the hydraulic working cylinder, which in turn moves the component. Through this emergency hand-operated bolt it is guaranteed that during closing of the vehicle top, a pressure increase occurs at the piston-side, for example, and at the same time the rod-side remains without pressure (for systems in which the closing of the vehicle top is effected by the extension of the working cylinder.) The same is applicable in reversed order in a sense for the piston and the rod-side to open the vehicle top. In case of failure of the (hydraulic) unit, the emergency hand-operated bolt can be manually operated and the rodside may be opened thereby. The system is therefore without pressure and the top or the cover or the like may be operated manually whereby the hydraulic medium is urged to the working chambers via the connecting bore.

Should the mounting site of the hydraulic unit be in an unfavorable location, then the emergency hand-operated bolt may be operated only with great difficulties. In most cases, the hydraulic unit is mounted at the rear fender areas and therefore a flexible shaft must be provided to be able to operate the emergency hand-operated bolt from the trunk space. A version with an electrically actuated 2/2-directional seat valve would again be costly and susceptible to malfunctioning.

It is the object of the present invention to improve on the known arrangement so that the described disadvantages are prevented, particularly in reference to the small available space and the mounting site with its difficult accessibility, and whereby particularly during failure of the pressure source there is made possible, in a simple and safe manner, manual emergency operation in any direction of the normally hydraulic operated vehicle component, such as the trunk lid, the cover, the vehicle top or the like.

SUMMARY OF THE INVENTION

This object is achieved, according to the invention, in an arrangement of the above-mentioned type in that a check valve is inserted into the pressure line blocking in the direction of the pressure source whereby a pressure relief line originates at a location between the check valve and the switching valve arrangement for the working cylinder, and whereby a shut-off element is inserted in the pressure relief line that opens when the pressure of the pressure source drops. Through employment of the blocking check valve and the shut-off element, the emergency hand-operated bolt can be eliminated all together and an automatic, gradually engaging device is thereby provided for pressure relief in the system, which then allows manual emergency operation of the normally hydraulically operated vehicle component. In case of a functioning hydraulic system, which means at normal operating pressure, one or each working cylinder is supplied with working medium through the pressure line. In case of malfunctioning of the (hydraulic) unit, the pressure in the pressure line is reduced because of pressure loss in the pressure source. The operating pressure is at first maintained by the check valve. Only when the shut-off valve is opened, the working medium may escape through the pressure relief line and subsequently the pressure drops to such a degree that the working cylinder—and thereby also the movable vehicle component—can be manually operated. Depending on the pressure by which the shut-off element is opened, an emergency holding function can be realized, which means that a pressure may be maintained within the system which hydraulically compensates for the weight and/or closing force of the moving vehicle component such as a trunk lid or a cover. Only when a pressure increase occurs in addition to the blocking effect of the shut-off element during manual operation, then the working medium is discharged through the pressure relief line and the working cylinder may now be operated manually. A possible throttle in the pressure relief line prevents excessively rapid pressure drop in the system and prevents thereby uncontrolled movements of the moving vehicle component.

According to an additional characteristic of the invention, a throttle is provided behind the shut-off element in the pressure relief line. A slower pressure drop is thereby guaranteed within the system, which prevents excessively rapid and uncontrolled movements after pressure failure in the pressure line.

When the shut-off element is a hydraulically switchable valve as in an additional characteristic of the invention, additional control systems for the shut-off element may be eliminated, which have higher requirements in terms of construction and control technology, and a fault-free simple shut-off element is provided having a direct and immediate controlling effect through the pressure in the pressure line.

It is advantageously proposed that the shut-off element is a hydraulically blocking check valve. The hydraulic counterforce may therefore be directly defined through adjustment of the blocking-force of the valve, which is the counterforce to the weight or closing force of the moving vehicle component during failure of the hydraulic system, and thus the emergency holding function is realized for said component. On the other hand, there is guaranteed by the design of a check valve opening away from the working cylinder, that during the use of manual supplementary force onto the normally hydraulically moved component it is made possible to open the valve element of the check valve. This is based on the related pressure increase and discharge the working medium through the pressure relief line, which therefore makes manual emergency operation possible.

It is thereby advantageously proposed that the valve element of the hydraulically blocking check valve may be blocked by a hydraulically actuated control piston having a larger surface than the one of the valve seat. This embodiment makes a secure locking position of the valve easier since a lower pressure than the operating pressure of the system is sufficient to shut the check valve based on these surface ratios.

Additionally, it is of advantage if in the described version of the shut-off element, which is functioning as a check valve, the control piston is designed as one piece together with the valve element. Structural and financial requirements are thereby reduced and a high operational dependability (of the check valve) is provided.

According to another characteristic of the invention, the control line for the hydraulically switchable valve originates at a location in front of the check valve of the pressure line. The blocking effect of the valve controlling the pressure relief is thereby immediately and directly dependent on the pressure in the pressure line, and additional control circuits or control devices may be eliminated thereby. Structural demands and space requirements are therefore especially low and operational dependability of the arrangement is considerably increased.

In an arrangement with at least one differentially controlled double-action working cylinder, which piston-side working chamber may be connected to a pressure source via a switching valve or possibly a check valve arrangement, the object of the invention is achieved in that the pressure relief line originates at a location if front of the switching valve and possibly in front of the check valve arrangement. Thereby there is no danger of negative influence on the drive of the working cylinder by the system component that is necessary for emergency operation, and there is also no distinct structural separation of the individual subordinate systems, which simplifies the installation and maintenance of the entire unit.

The latter advantage does also exist if an arrangement with a pressure source is provided with at least one single-action pump, a tank for the working medium, and possibly auxiliary components such as a check-valve arrangement and/or a pressure relief valve and/or a throttle, whereby the check valve is disposed in the pressure line behind the auxiliary components of the pressure source, and whereby the pressure relief line is connected to the tank so that no working medium can escape or can negatively impact the environment.

The invention will be better understood by reference to accompanying drawings taken in conjunction with the following discussion.

BRIEF DESCRIPTION OF THE DRAWINGS

FIG. 1 shows a schematic hydraulic circuit of an exemplary hydraulic arrangement according to the invention.

FIG. 2 shows a schematic illustration of the functioning of a hydraulically blocking check valve used as a shut-off element.

DETAILED DESCRIPTION OF THE PREFERRED EMBODIMENTS

The arrangement for hydraulic actuation of a vehicle top, a cover, a trunk lid or any other movable vehicle component (illustrated in FIG. 1), is provided with two double-action hydraulic cylinders 1, for example, which are joined on one side to the vehicle and on the other side to a vehicle component, for instance the vehicle top or an interconnected lever arrangement. The working cylinders 1 are differentially driven whereby the piston-side working chambers and the rod-side working chambers of the working cylinder 1 are connected via lines 2, 3 to a hydraulic unit 5, which serves as a pressure source and which advantageously communicates with the electric circuit of the vehicle for the supply of energy.

The hydraulic unit 5 includes a single-action pump 6 having a drive motor, a check valve arrangement 7, a pressure relief valve 8 for adjustment of the maximum system pressure, and a tank 9 for the working medium - the hydraulic oil. A throttle 10 may also be installed in the hydraulic unit 5 just before the line exit.

A control valve 11 having a check valve arrangement 12 is provided for the differential drive of the working cylinders 1 in line 2 leading to the piston-side working chamber. The control valve 11 alternately connects this working chamber with the pressure line 4 and a secondary line 13, possibly via an inserted throttle, to the tank 9 while the rod-side working chamber of one or each working cylinder 1 continually remains in communication with the pressure line 4.

Finally, connections 15 may also be provided for additional hydraulic working units, such as additional working cylinders.

A check valve 16, blocking in the direction of the hydraulic unit 5, is inserted in the pressure line 4 that leads from the hydraulic unit 5 to the working cylinder 1, preferably in front of the control valve 11 and/or the check valve arrangement 12. The check valve 16 mainly maintains the operating pressure in the following system section in case of failure of the hydraulic unit 5. A pressure relief line 17 branches off from the pressure line behind the check valve 16 and leads to the tank 9. A shut-off valve 19, which is advantageously hydraulic and which may be switched via the control line 18, is inserted in the pressure relief line 17, and subsequently a throttle 20 may be inserted to prevent an excessively rapid pressure drop in the system. Since the control line 18 for the shut-off valve 19 originates at the location between the hydraulic unit 5 and the check valve 16, an immediate controlling effect for the shut-off valve 19 is guaranteed, depending on the pressure supplied by the hydraulic unit 5. The shut-off valve 19 is designed in itself in a manner whereby moving in the shut-off direction is achieved by means of a closing spring 21, but which movement may be counteracted by a pressure increase in the system behind the check valve 16 through a second control line 22 or through functionally equivalent components or designs of the shut-off valve 19 itself.

In FIG. 2 there is shown in a schematic illustration, an advantageous embodiment of the shut-off valve 19 in the form of a hydraulically blocking check valve. A valve seat 23 is designed in the housing of the check valve 19 whereby the valve seat 23 may be closed by a valve element 24. The valve element 24 has preferably a conical shape and the cross section of the seat 23 is smaller than the cross section of a control piston 25, which is biased by pressure via the control line 18 that is in front of the check valve 16. The valve element 24 and the control piston 25 are preferably designed as one piece having a circumferential groove to receive a seal 26. Thereby, the closing spring 21 also acts directly upon the valve element 24 via the control piston 25 to move the valve element 24. At normal operating pressure in the pressure line 4, secure closing of the shut-off valve 19 is guaranteed based on the surface cross section of the control piston 25 that is larger than the one of the valve seat 23. During a pressure drop in front of the check valve 16, the pressure in the control line 18 also drops to that value so that the opening pressure of the shut-off valve 19 substantially depends now more on the force of the closing spring 21. As long as this opening pressure is met or is exceeded in the pressure line section, which is arranged behind the check valve 16, the valve element 14 is lifted from the valve seat 23 against the force of the closing spring 21 and the working medium can thus escape through the pressure relief line 17 into the tank 9 of the hydraulic system 5.

We claim:

1. A hydraulic apparatus for moving a component of a vehicle, said hydraulic apparatus comprising: a double-acting cylinder which has working chambers and is connectable at one end to a vehicle and at a second end to a component to be moved, a hydraulic unit for supplying pressurized hydraulic medium, a pressure delivery line for delivering pressurized hydraulic medium from said hydraulic unit to said working cylinders of said double-acting cylinder, a one-way check valve in said pressure delivery line to block return flow of pressurized hydraulic medium to said hydraulic unit, a pressure relief line connected to said pressure delivery line between said check valve and said working cylinders for discharge of pressurized hydraulic medium to a tank, and a hydraulically-switchable check valve in said pressure relief line, said hydraulically-switchable check valve including a valve seat, a valve element, a spring which biases said valve element against said valve seat to block flow of pressurized hydraulic medium through said pressure relief line to said tank, and a control line which connects to said pressure delivery line between said hydraulic unit and said one-way check valve and delivers pressurized hydraulic medium to said valve element to bias said valve element against said valve seat, said valve element being moved away from said valve seat to open said pressure relief line by pressurized hydraulic medium in said pressure delivery line with discontinued operation of said hydraulic unit.

2. A hydraulic apparatus according to claim 1, including a throttle element in said pressure relief line downstream of said hydraulically-switchable check valve.

3. A hydraulic apparatus according to claim 1, including a piston on a side of said value element opposite said valve seat, said piston having a larger cross section than a cross section of said valve seat.

4. A hydraulic apparatus according to claim 3, wherein said valve element a:nd said piston are a one-piece structure.

5. A hydraulic apparatus according to claim 1, including a control valve in said pressure delivery line for directing flow of pressurized hydraulic medium to a working chamber of said double-acting cylinder or from a working cylinder to a tank, and wherein said pressure relief line connects to said pressure delivery line between said one-way check valve and said control valve.

6. A hydraulic apparatus according to claim 1, wherein said hydraulic unit includes a single-action pump, a tank, a throttle and a pressure-relief valve.

* * * * *